April 23, 1968  J. WENGLARZ  3,378,996
SELF-CLEANING RAKE
Filed May 17, 1965

INVENTOR.
JOHN WENGLARZ
BY
RONALD C. KAMP
ATTORNEY

United States Patent Office 3,378,996
Patented Apr. 23, 1968

3,378,996
SELF-CLEANING RAKE
John Wenglarz, 253 Chicago St.,
East Peoria, Ill. 61611
Filed May 17, 1965, Ser. No. 456,354
3 Claims. (Cl. 56—400.2)

ABSTRACT OF THE DISCLOSURE

A self-cleaning rake having a rake head with a pair of arms pivotally secured to the free ends of a bifurcated bracket carried by a handle; the arms having a flat upper surface, and the ends having an ear with a flat lower surface. A pair of spring means engaging the bracket ends and the arms to urge the rake head into a raking position wherein the flat surfaces are in plane contact and the head being pivotable to a cleaning position in which the surfaces are in line contact.

---

The present invention relates to self-cleaning rakes in general, and more particularly to self-cleaning rakes which are non-clogging in use.

One of the most perplexing problems in the operation of a hand rake is the fact that the leaves, grass and debris tend to become wedged between the teeth or tines of the rake head, necessitating an interruption of the raking operation, while the rake is inverted and the accumulated debris is removed from the teeth by hand. Such a cleaning operation is time consuming and possibly injurious to the hands of the operator. That this problem has long been recognized is evidenced by the many patents, e.g. the Anderson Patent No. 1,197,003, that have proposed solutions. However, the self-cleaning rakes of the prior art had a common deficiency in that the mechanism which performed the cleaning function was itself subject to becoming clogged by the very debris it was inteded to eject. In addition, the prior art devices often utilized a single spring device for biasing the rake head into cleaning position, or pivoted the rake head from the handle at a single point or at spaced points which were separated by a distance representing only a fraction of the rake head length. Thus, when force was applied to manipulate the self-cleaning action of the rake, a binding action would result making the cleaning operation difficult and sometimes impossible.

It is, therefore, an object of the present invention to provide a self-cleaning rake which will be free from clogging and which will operate easily and continuously.

It is also an object of this invention to provide a self-cleaning rake which will function on all types of terrain regardless of the debris or vegetation encountered.

Figure 1:
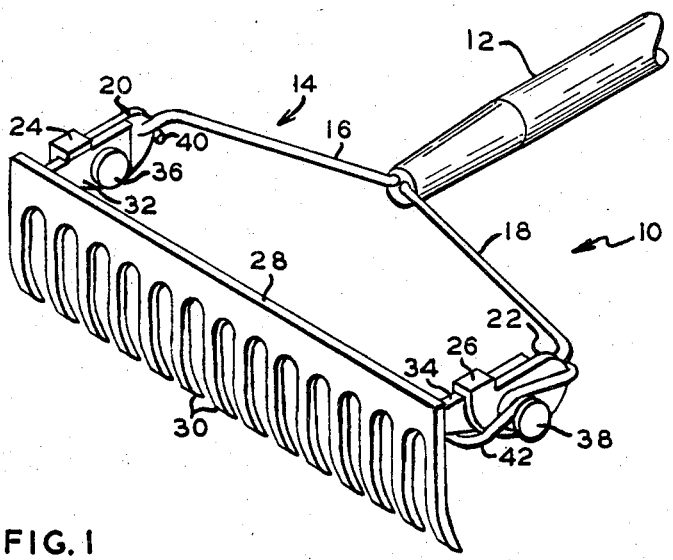
Figure 2:
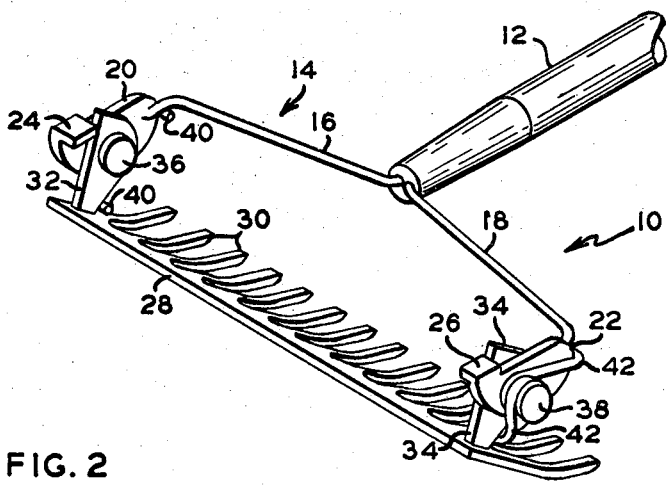

These and other objects and many of the attendant advantages of the present invention will become more readily apparent from a perusal of the following description and the accompanying drawing, wherein:

FIG. 1 is an isometric view of the present invention showing the rake in raking position; and FIG. 2 is an isometric view, similar to that of FIG. 1, showing the rake in cleaning position.

Referring now in detail to the illustrated embodiment, there is shown in FIGS. 1 and 2, a rake, indicated generally at 10, having a handle 12 which is designed to be gripped by the operator thereof. A generally U-shaped or bifurcated bracket 14 defining a pair of forwarding extending arms 16 and 18 is attached to the handle 12. A pair of end members 20 and 22 are secured to the arms 16 and 18 respectively. Each end member has an inwardly projecting ear or stop 24 and 26. A rake head 28, having a plurality of teeth or tines 30, is provided with a pair of rearwardly projecting arms 32 and 34. Pins 36 and 38, which may be ordinary bolts if desired, pivotally secure the arms 32 and 34 to the end members 20 and 22 respectively. Coiled torsion springs 40 and 42 are retained by the pins 36 and 38 and have one extension thereof engaging the arms 32 and 34 and the other extension engaging the end members 20 and 22. These springs 40 and 42 urge the rake head 28 into the raking position shown in FIG. 1. The ears or stops 24 and 26 project inward from the end members 20 and 22 a distance substantially equal to the thickness of the arms 32 and 34, thereby presenting a smooth clean surface which will not collect debris. In addition, when in the raking position, the arms 32 and 34 present a flat upper surface for contact with the flat lower surface of the ears 24 and 26, which surfaces are in contact throughout thereby defining a plane of contact. Such an arrangement acts as a deterrent to the collection or accumulation of debris which would inhibit the pivotal action necessary for cleaning. Also, the use of a coiled torsion spring, instead of a coiled tension or extension spring affords a smooth clean exterior which discourages accumulation of any debris.

Operation

When the rake 10 is held, by means of the handle 12, elevated from the ground, the springs 40 and 42 force the rake head 28 into the position shown in FIG. 1. As the rake is then placed into contact with the ground and pulled toward the operator, it will function in the same manner as an ordinary rake. The rake head 28 will maintain this raking position continuously throughout such a pulling stroke because the pivot pins 36 and 38 are located to the rear of the stops 24 and 26. The turning moment resulting from the resistance to movement of the tines 30 over the ground forces the arms 32 and 34 even more tightly against the stops 24 and 26. Such an arrangement not only assures the maintenance of the raking position, but also insures that the leading edge of the stops 24 and 26 are tight against the arms 32 and 34 to prevent grass, leaves, and debris from wedging therebetween.

At the completion of the pulling or raking stroke, or wherever sufficient debris has accumulated between the tines, the operator can force the tines into the ground and push away from himself. The resistance to movement of the tines 30 will now create a turning moment about the pins 36 and 38 in the opposite direction, which will be greater than the moment exerted by the coiled torsion spring, causing the rake head 28 to pivot to the position shown in FIG. 2, i.e. the cleaning position. As the rake head 28 is then moved along the ground away from the operator any debris will be forced out of the tines 30 because of the frictional force between the ground and the debris. Because it is necessary for the upper portion of the tines and the connecting head to be in close contact with the ground, it is desirable that a slight rearward curve be provided in the tines.

The ground is often, in fact almost always, uneven and thus one end or corner of the rake head may be in contact therewith when the other end is not. If only one pivot point, or two closely spaced pivot points, between the head 28 and the bracket 14 is provided there is a distinct possibility that the pivotal action may be inhibited due to binding. The rake of the present invention minimizes this possibility by utilizing two pivot points located at the outer extremes of the rake head. In addition, where but one return spring is provided which is not exactly centered on the rake head, a very likely possibility in a mass production item, the spring force exerted to return the rake head to raking position will create another moment, about an axis transverse to the axis of the pivot pins, preventing the unit from moving freely. The present invention precludes this possibility by providing a pair of springs at the outer ends of the rake, thereby assuring that the pivotal action is free and unhindered at all times.

It can be seen, therefore, that the present invention provides an improved self-cleaning rake which will operate without clogging under even adverse conditions and which will inherently function freely and uniformly, an important feature in any hand operated device.

While there is shown herein one form which the invention may take, it is to be understood that changes and modifications may be made without departing from the spirit of the invention as defined by the appended claims.

What is claimed is:

1. A self-cleaning rake comprising:
   a handle,
   a bifurcated bracket having two free ends secured to said handle,
   an ear having a flat lower surface on each of said ends,
   a rake head having a plurality of tines,
   a pair of arms secured to said head and pivotally attached to said ends,
   said arms having a flat upper surface,
   said head being movable between a raking position in which said flat surfaces are in plane contact and a cleaning position in which said surfaces are in line contact, and spring means engaging said bracket and said arms for urging said head into said raking position.

2. A self-cleaning rake according to claim 1, wherein said arms are attached to the outer extremes of said head whereby the possibility of binding is minimized.

3. A self-cleaning rake according to claim 2, wherein pin means pivotally attach said arms to said ends, and said spring means comprises a pair of coiled torsion springs, each of said springs having a coil and a pair of extensions, said coil being retained on said pin means and one of said extensions engaging said arm and the other of said extensions engaging the free end.

References Cited

UNITED STATES PATENTS

| | | | |
|---|---|---|---|
| 962,576 | 6/1910 | Menzel | 56—400.08 |
| 2,162,648 | 6/1939 | Slusher | 56—400.2 |
| 2,286,939 | 6/1942 | Swanson | 56—400.2 |
| 2,671,302 | 3/1954 | Prudlo | 56—400.2 |

ANTONIO F. GUIDA, *Primary Examiner.*

ABRAHAM G. STONE, *Examiner.*

P. A. RAZZANO, *Assistant Examiner.*